United States Patent [19]
Goel

[11] Patent Number: 4,707,532
[45] Date of Patent: Nov. 17, 1987

[54] COPOLYMERIZATION OF BLOCKED POLYISOCYANATES WITH BICYCLIC AMIDE ACETALS

[75] Inventor: Anil B. Goel, Worthington, Ohio

[73] Assignee: Ashland Oil, Inc., Ashland, Ky.

[21] Appl. No.: 42,915

[22] Filed: Apr. 27, 1987

[51] Int. Cl.$^4$ .............................................. C08G 18/81
[52] U.S. Cl. ........................................ 528/45; 528/73
[58] Field of Search ........................................... 528/45

[56] References Cited

U.S. PATENT DOCUMENTS

| 4,558,113 | 12/1985 | Goel ...................................... 528/59 |
| 4,562,240 | 12/1985 | Goel et al. ............................ 528/73 |
| 4,579,877 | 4/1986 | Goel et al. ........................... 521/163 |
| 4,584,363 | 4/1986 | Goel et al. ............................. 528/73 |
| 4,594,397 | 6/1986 | Goel et al. ........................... 525/528 |
| 4,601,995 | 7/1986 | Goel .................................... 502/155 |

Primary Examiner—Harold D. Anderson
Assistant Examiner—Dennis R. Daley
Attorney, Agent, or Firm—John F. Jones

[57] ABSTRACT

A process for preparing polyurethane comprising copolymerization of a mixture comprising a bicyclic amide acetal and a blocked polyisocyanate at a temperature in the range of from about room temperature to about 200° C. is described. The polymerization mixture may also contain polyamines, polyols, and polyepoxides and the polymers resulting from this process are useful as coatings, adhesives, and in elastomer synthesis.

7 Claims, No Drawings

COPOLYMERIZATION OF BLOCKED POLYISOCYANATES WITH BICYCLIC AMIDE ACETALS

The present invention relates to a process for the copolymerization of bicyclic amide acetals and blocked polyisocyanates and to the copolymerization of blocked polyisocyanates with polyamines and polyols in the presence of bicyclic amide acetals.

Blocked polyisocyanates have been known to copolymerize with polyols and polyamines to give flexible and rigid polymers which have been used in applications such as coatings, adhesives, in elastomer synthesis, and the like. The copolymerization of blocked polyisocyanates with bicyclic amide acetals has not previously been reported nor has the copolymerization of blocked polyisocyanates with polyamines or polyols in the presence of bicyclic amide acetals as polymerization accelerators been reported heretofore.

German Pat. No. 3,235,933 discloses that bicyclic amide acetals can be copolymerized with polyisocyanates to give rigid, brittle polymers (see also U.S. Pat. Nos. 4,549,005; 4,562,240; and 4,582,890).

The reactions of polyisocyanates with polyamines have been known to proceed rapidly to give polyurea polymers. Sterically hindered polyamines are used to have some controllable rate of polymerization with polyisocyanates but still the systems of the prior art do not have enough pot life (time they can be used) to enable one to use polyisocyanate/polyamine polymer systems in many applications. In order to achieve longer pot life, blocked polyisocyanates have been used in place of the polyisocyanates in the copolymerization with polyamines. It is well known that when polyisocyanates which are blocked with phenols, oximes, caprolactam, methyl alkyl ketones, beta-dicarbonyl compounds, and the like (here blocking means reacting the isocyanate groups with a compound which renders the isocyanate groups unreactive to active hydrogen compounds but thermally or chemically can be reversed or unblocked to yield back the reactive isocyanate group) are mixed with an active hydrogen compound such as a polyamine or an aliphatic polyol, the copolymerization reaction will occur at a rate much slower than that observed when the free polyisocyanate is used. Thus, the reaction of a polyol with a blocked polyisocyanate requires much higher temperatures than would be required when the unblocked polyisocyanate is used.

In addition to the advantage of providing longer pot life, the use of blocked polyisbcyanates also helps reduce the toxic hazard associated with the use of some polyisocyanates. Although blocked polyisocyanates have been copolymerized with polyols and polyamines, [see "Progress in Organic Coatings," 3 (1975) 73–99 and 9 (1981) 3–28], no such copolymerization reactions of blocked polyisocyanates with bicyclic amide acetals have been described in the prior art. In the absence of any reactive proton, the reaction of a bicyclic amide acetal with a blocked isocyanate group is quite unexpected, although, copolymerization of bicyclic amide acetals with polyisocyanates catalyzed by certain catalysts and in the presence of additives such as polyols and polyamines has been reported recently in U.S. Pat. Nos. 4,601,995 and 4,562,240.

It has now been found that blocked isocyanates which are the reaction products of isocyanates with phenols, oximes, caprolactam, methyl alkyl ketones, beta-dicarbonyl compounds and the like react readily with bicyclic amide acetals of formula I at reaction temperatures ranging from room temperature to about 200° C. In fact, the reaction rate of bicyclic amide acetals and phenol blocked polyisocyanates has been found to be faster than that of the reaction of blocked polyisocyanates with aliphatic polyols.

The reaction of blocked polyisocyanates with the amide acetals of this invention have been found to yield polymeric products. The rate of the copolymerization of these materials can be accelerated by including catalysts such as tertiary amines, organometallic compounds such as carboxylates, acetylacetonate salts of various metals including tin, lead, bismuth, zinc, cobalt, nickel, iron, vanadium, mercury, copper, and the like. Some representative useful catalysts are stannous octoate, dibutyltin dilaurate, zinc octoate, bismuth octoate, cobalt naphthoate, ferric acetylacetonate and the like. It has further been found that bicyclic amide acetals also act as reactive catalysts for the cure speed acceleration of the copolymerization reactions of blocked polyisocyanates with polyols and polyamines. Thus, the blocked polyisocyanates can be cured with a mixture of bicyclic amide acetal with polyamines and polyols. Bicyclic amide acetals useful in the present invention include those conforming to the formula I

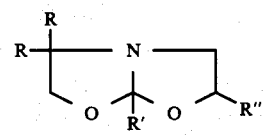

wherein R and R" independently represent hydrogen, an alkyl or alkyl ether group having from 1 to 20 carbon atoms, an aryl or aryl ether group having from 6 to 20 carbon atoms, an alkaryl group having from 7 to 20 carbon atoms and R' represents hydrogen, an alkyl or alkyl ether group having from 1 to 20 carbon atoms or an alkaryl group having from 7 to 20 carbon atoms.

The types of polyamines which can be used in curing the blocked polyisocyanates include aromatic polyamines and aliphatic polyamines having primary and secondary amino groups and may also contain tertiary amine groups. Useful amines of this type include ethylene diamine, propylene diamine, hexamethylene diamine and the like; diethylene triamine, triethylene tetramine, dipropylene triamine and the like; cyclohexane diamine, isophorone diamine and the like; bis-(aminomethyl) cyclohexane, dimer acid diamine, methylene bis(phenyl amine), poly(alkylene oxide) di- and triamines having molecular weights ranging from 200 to 10,000, aminoethyl piperazine, bis(aminopropyl) piperazine and the like.

The polyols which can be used in the process of this invention include short chain polyols and long chain poly(alkylene oxide) polyols and polyester polyols. Suitable for use are polyols such as ethylene glycol, propylene glycol and the like; trimethylol propane, diethylene or dipropylene glycol butane diol, pentaethythritol and the ethylene or propylene oxide capped products thereof and the like.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,2-diisocyanate, 1,4-diisocyanato cyclohexane, cyclopentene-1,3-diisocyanate, p-phenylene diisocyanate, 1-methyl phenylene-1,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. The aromatic polyisocyanates are preferred. Polyisocyanates which are polymeric in nature including isocyanate prepolymers of all types are included in this invention.

The blocked polyisocyanates may be prepared by the reaction of the blocking agent with the polyisocyanate as is known in the art. Preferred blocking agents are those having one or more groups selected from phenolic, oxime, lactam and beta-diketone. Most preferred are the monophenols such as phenol, alkyl substituted phenols including methyl phenol ethylphenol, nonylphenol, alkoxy substituted phenols such as methoxy phenol, ethoxy phenol, naphthols, and the like.

In the copolymerization of the blocked polyisocyanate with the bicyclic amide acetal, the bicyclic amide acetal behaves at least as a bifunctional molecule towards an isocyanate group. In the polymerization reactions of blocked polyisocyanates with bicyclic amide acetals, reactive additives such as polyepoxides may also be included in addition to curing agents such as polyamines, fillers, plasticizers, pigments and the like.

The polymers produced by the process of this invention have utility in many applications including coatings, adhesives, sealants, elastomers, reaction injection molding applications, reinforced plastics, and the like and others. For instance, the flexible formulations using blocked polyisocyanate prepolymers of molecular weight of from about 1,000 to about 10,000 cured with bicyclic amide acetal alone or in combination with polyamines can be used as adhesives for flexible and semi-structural substrates such as fabrics used in automotive interiors, thermoplastic sheets, carpeting, and the like.

This invention is further illustrated in the following representative examples.

EXAMPLE 1

A nonyl phenol blocked triisocyanate prepolymer of molecular weight of 4690 was obtained by the reaction of a poly(propylene oxide) triol with toluene diisocyanate in an equivalent ratio of two NCO groups per hydroxyl group followed by the reaction with nonyl phenol (one equivalent per equivalent of NCO). To 15.6 g of this blocked polyisocyanate prepolymer was added 0.7 g of methyl substituted bicyclic amide acetal (formula I wherein R and R" represent hydrogen and R' represents a methyl group) and a clear, viscous liquid mixture resulted. This liquid was applied to a Mylar (polyethylene terephthalate) sheet in the form of a film which was about 1–2 mils thick and the sheet was then heated at 55° C. for one hour during which time the film partially cured to give a tacky material on the surface of the Mylar sheet. This material was tested as a pressure sensitive adhesive and showed a Polyken Probe tack (ASTM D-279) of 350, and 180° peel strength (PSTC-1) of 35 oz./in.

EXAMPLE 2

A phenol blocked triisocyanate prepolymer of molecular weight of 1040 was obtained by the reaction of trimethylol propane with toluene diisocyanate in a 1:3 molar ratio followed by the reaction of the product with 3 moles of phenol per mole of the prepolymer. The resulting solid was finely powdered to give a particle size of less than 100 mesh. A 7.0 g portion of this blocked triisocyanate prepolymer was mixed with 1.4 g of the bicyclic amide acetal described in Example 1 and was heated at 55° C. for 10 minutes during which time the mixture turned into a solid gel. The gel was then postcured at 100° C. for 20 minutes to give a thermoset solid polymer which was infusible and was found to be insoluble in solvents such as toluene, acetone and other common organic solvents.

EXAMPLE 3

The procedure of Example 1 was followed using a nonyl phenol blocked polyisocyanate prepolymer having an average NCO functionality of 2.7 with blocked NCO equivalent weight of 1750. A 17.5 g portion of this prepolymer was mixed with 0.3 g of diethylene triamine and 0.2 g of the bicyclic amide acetal. The resulting solution was applied to a Mylar sheet as in Example 1 and the film was cured at 53° C. The film reached a semi-gelled stage in about six minutes to give a highly tacky film (non-cohesive failure upon touching). The pressure sensitive adhesive properties for this film were found to be as follows: Polyken Probe tack (ASTM D-279) of 500, 180° peel strength (PSTC-1) of 100 oz./in. against stainless steel and 500 g shear resistance (PSTC-7) was greater than 24 hours (no slippage of bond). As a comparison, a film prepared in a similar manner from an adhesive made from the blocked polyisocyanate and diethylene triamine without the bicyclic amide acetal took 10 minutes to give a semi-cured film and this film had a Polyken Probe tack of 480 and a 180° peel strength of 80 oz./in. This shows that the addition of the bicyclic amide acetal to the reaction mixture of blocked polyisocyanates and polyamines results in faster curing to give a polymer having improved physical properties.

EXAMPLE 4

The procedure of Example 1 was followed using 17.5 g of the nonyl phenol blocked polyisocyanate of Example 3, 1 g of liquid digylcidyl ether of Bisphenol-A, 0.4 g of diethylene triamine and 0.34 g of the bicyclic amide acetal. The resulting liquid was applied to a Mylar sheet, and the sample cured at 53° C. developed a semi-gelled stage within six minutes to give a tack of 600, a peel strength of 120 oz./in. and 500 g shear resistance of greater than 24 hours without any bond slippage. After six hours at room temperature the sample showed tack of 640, peel strength of 65 oz./in. and 500 g shear resistance was greater than 24 hours without any bond slippage against stainless steel. After 24 hours at room temperature, the sample showed tack of 340 with peel strength of 25 oz./in.

EXAMPLE 5

The procedure of Example 4 was followed using 17.5 g of the blocked polyisocyanate prepolymer of Example 3, 1 g of liquid diglycidyl ether of Bisphenol-A, 0.4 g of triethylene tetramine of 0.2 g of the bicyclic amide acetal. The five-hour room temperature cured film showed tack of 597, peel strength of 37 oz./in. and 500 g shear resistance of greater than 24 hours without bond slippage. The sample cured at 53° C. for 4.5 minutes showed tack of 680 and peel strength of 62 oz./in. This sample adhered to a polyester foam backed polyester fabric which, upon attempted peeling resulted in fabric/foam interface delamination.

EXAMPLE 6

The composition of Example 4 was filled with 20% by weight of dry talc filler and the degassed sample was used as a structural adhesive to bond fiberglass reinforced polyester plastic sheets (sheet molding compound of SMC) in 30 mils bond thickness covering a one square inch bond area using 4 inches long by 1 inch wide by 100 mils thick coupons of the sheet as substrates. The adhesive test samples were cured at room temperature for 24 hours and the resulting structures showed an average lap shear strength of 260 psi and the samples cured at 100° C. for 10 minutes showed lap shear strength of approximately 300 psi The filled material was also tested as an elastomer by preparing a 1/16 inch thick sheet of the material and curing at 100° C. for 15 minutes. The resulting highly flexible elastomer was found to have an elongation of 110% with a tensile strength of 490 psi.

EXAMPLE 7

The blocked polyisocyanate prepolymer of Example 4 (11.5 g) was mixed with 0.6 g of poly(propylene oxide) triamine (milecular weight 400) and 0.3 g of the bicyclic amide acetal described in Example 1. The resulting solution was kept at room temperature overnight during which time it cured to give a solid thermoset polymer which was infusible and did not dissolve in common organic solvents such as toluene.

EXAMPLE 8

The procedure of Example 4 was followed using 17.5 g of the blocked polyisocyanate of Example 3, 0.3 g of 1,3-diaminopropane and 0.2 g of the bicyclic amide acetal of Example 1. The film cured at room temperature in 15 minutes to provide enough adhesive strength towards a polyester foam backed polyester fabric that it resulted in delamination of the fabric when tested. The adhesive was found to have a tack of 520, a peel strength of 82 oz./in. and no slippage was observed in the 500 g shear resistance test.

I claim:

1. The process comprising copolymerizing a mixture comprising a bicyclic amide acetal and a blocked polyisocyanate at a temperature in the range of from about room temperature to about 200° C.

2. The process of claim 1 wherein the bicyclic amide acetal is one of formula I

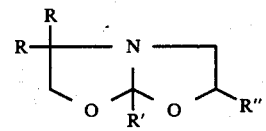

wherein R and R" independently represent hydrogen, an alkyl or alkyl ether group having from 1 to 20 carbon atoms, an aryl or aryl ether group having from 6 to 20 carbon atoms, an alkaryl group having from 7 to 20 carbon atoms and R' represents hydrogen, an alkyl or alkyl ether group having from 1 to 20 carbon atoms or an alkaryl group having from 7 to 20 carbon atoms.

3. The process of claim 2 wherein the polyisocyanate is one containing more than one isocyanate group per molecule and in which the blocking agent is one selected from the group consisting of phenols, oximes, caprolactam, methyl alkyl ketones and beta-dicarbonyl compounds.

4. The process of claim 3 wherein the blocking agent is a mono phenol selected from the group consisting of phenol, methyl phenol, ethyl phenol, nonyl phenol, methoxy phenol, ethoxy phenol and naphthol.

5. The process of claim 4 wherein the blocked polyisocyanate is a prepolymer of poly(propylene oxide) triol and toluene diisocyanate blocked with nonyl phenol and the bicyclic amide acetal is one in which R and R" represent hydrogen and R' represents a methyl group.

6. The process of claim 4 wherein the blocked polyisocyanate is a polyisocyanate prepolymer of trimethylol propane and toluene diisocyanate blocked with phenol and the bicyclic amide acetal is one in which R and R" represent hydrogen and R' represents a methyl group.

7. The process of claim 5 wherein there is also included a polyepoxide and a polyamine.

* * * * *